United States Patent
Gupta et al.

(10) Patent No.: US 10,055,198 B1
(45) Date of Patent: Aug. 21, 2018

(54) SYSTEMS AND METHODS FOR PROBABLY APPROXIMATE INTENT MATCHING OF PROCUREMENT RULES

(71) Applicant: SAP SE, Walldorf (DE)

(72) Inventors: Vipul Gupta, Bangalore (IN); Rick Banerjee, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/621,031

(22) Filed: Jun. 13, 2017

(51) Int. Cl.
| | |
|---|---|
| G06F 9/44 | (2018.01) |
| G06F 9/445 | (2018.01) |
| G06F 8/10 | (2018.01) |
| G06F 8/60 | (2018.01) |
| G06F 8/70 | (2018.01) |
| G06F 8/71 | (2018.01) |

(52) U.S. Cl.
CPC ............... *G06F 8/10* (2013.01); *G06F 8/60* (2013.01); *G06F 8/70* (2013.01); *G06F 8/71* (2013.01)

(58) Field of Classification Search
CPC ...... G06F 8/10–8/60; G06F 8/70; G06F 8/71; G06F 8/75
See application file for complete search history.

(56) References Cited

U.S. PATENT DOCUMENTS

| | | | | |
|---|---|---|---|---|
| 5,084,813 A | * | 1/1992 | Ono | G06F 8/30 706/922 |
| 5,890,158 A | * | 3/1999 | House | G06F 8/71 |
| 7,712,078 B1 | * | 5/2010 | Mirchandani | G06F 8/76 717/111 |
| 8,365,247 B1 | * | 1/2013 | Wiese | G06F 17/30949 707/698 |
| 8,533,583 B2 | * | 9/2013 | Miyahara | G06Q 10/087 715/212 |
| 8,533,673 B2 | * | 9/2013 | Anlauff | G06F 8/20 717/106 |
| 9,177,293 B1 | * | 11/2015 | Gagnon | G06Q 10/107 |
| 9,262,134 B2 | * | 2/2016 | Kelapure | G06F 8/40 |
| 9,733,933 B1 | * | 8/2017 | Arquero | G06F 8/33 |
| 9,971,594 B2 | * | 5/2018 | Fox | G06F 8/70 |

(Continued)

*Primary Examiner* — Benjamin Wu
*Assistant Examiner* — Zheng Wei
(74) *Attorney, Agent, or Firm* — Buckley, Maschoff & Talwalkar LLC

(57) ABSTRACT

A method to quantify compliance of a software snippet having a plurality of code lines includes generating an OpsHash fingerprint of the software snippet, dividing the software snippet OpsHash fingerprint into a first group containing one or more OpsHash fingerprint based on context code lines, and a second group containing one or more OpsHash fingerprint based on operation-on-context code lines, applying a probably approximate matching algorithm to the first group, generating context cardinality sets from the OpsHash fingerprints of the first group, quantifying a match between each of the context cardinality sets and at least one of a governing definition and a rule/technique definition, ranking the OpsHash fingerprints of the first group based on the quantifying match, and incorporating software snippets having an OpsHash fingerprint ranking above a predetermined threshold into a software application. A system to implement the method and a non-transitory computer-readable medium are also disclosed.

15 Claims, 3 Drawing Sheets

(56) References Cited

U.S. PATENT DOCUMENTS

| | | | |
|---|---|---|---|
| 2006/0190931 A1* | 8/2006 | Scott | G06F 8/20 |
| | | | 717/136 |
| 2007/0156712 A1* | 7/2007 | Wasserman | G06F 8/20 |
| 2009/0094272 A1* | 4/2009 | Skriletz | G06F 8/10 |
| 2012/0166811 A1* | 6/2012 | Maheshwari | G06F 8/71 |
| | | | 713/187 |
| 2013/0152047 A1* | 6/2013 | Moorthi | G06F 11/368 |
| | | | 717/124 |
| 2013/0185722 A1* | 7/2013 | Kruglick | G06Q 10/063 |
| | | | 718/1 |
| 2013/0311496 A1* | 11/2013 | Fedorenko | G06F 8/71 |
| | | | 707/758 |
| 2014/0149366 A1* | 5/2014 | Huang | G06F 17/30156 |
| | | | 707/692 |
| 2014/0201169 A1* | 7/2014 | Liu | G06F 17/30 |
| | | | 707/692 |
| 2015/0237410 A1* | 8/2015 | Yu | H04N 21/812 |
| | | | 725/32 |
| 2015/0261524 A1* | 9/2015 | He | G06F 9/4488 |
| | | | 717/120 |
| 2016/0124966 A1* | 5/2016 | Cohen | H04L 9/3231 |
| | | | 707/723 |
| 2018/0011849 A1* | 1/2018 | Oztaskent | H04N 21/233 |

* cited by examiner

SYSTEMS AND METHODS FOR PROBABLY APPROXIMATE INTENT MATCHING OF PROCUREMENT RULES

DETAILED DESCRIPTION

In accordance with embodiments, systems and methods generate a unique fingerprint for a snippet of customized code written in a domain specific language. Similarly, a fingerprint is generated from generally accepted business rules, regulatory and/or geographic-specific procurement rules to be implemented by the SaaS procurement system. A probably approximate matching algorithm is applied to these fingerprints to measure the conformity between the customized code rules and the generally accepted business rule, regulatory and/or geographic-specific procurement rules. The measure of the conformity can be quantified by a computer-based system applying predetermined threshold (s). In some implementations, as a result of the quantification, customized code determined to be acceptable can be pushed to one or more SaaS procurement systems. Customized code not meeting the predetermined conformity threshold can be flagged for review.

In accordance with embodiments, a SaaS procurement system can accommodate the diverse needs of its users by offering customization capabilities. These customization capabilities can be specified via configurable Business Process Flows and/or Serverless Architectures. Serverless Architectures can be driven by business logic embedded in constructs such as Lambda functions. Users can be provided tools to configure a Business Process Flows connecting various services that are available from the SaaS procurement system. In some implementations, users can access services offered by third party partners. In additional implementations, users can write small snippets of executable code in a domain specific language, to specify custom Business Logic catering to the users' proprietary needs.

The SaaS procurement can include a datastore containing definitions of basic rules and generally accepted techniques in which business processes might operate. These definitions can vary based on the specific nature of the enterprise, its vertical positioning within the industry, along with its operational region(s) and their local culture(s). These rule/technique definitions can be identified in the system as Configuration files.

Configuration files can also include definitions relating to the jurisdictional, legal, and/or regulatory framework(s) governing a procurement process. The rule/technique definitions and the governing definitions can be written using a one or more domain specific language(s) based on a particular application where a definition might be incorporated.

Figure 1:
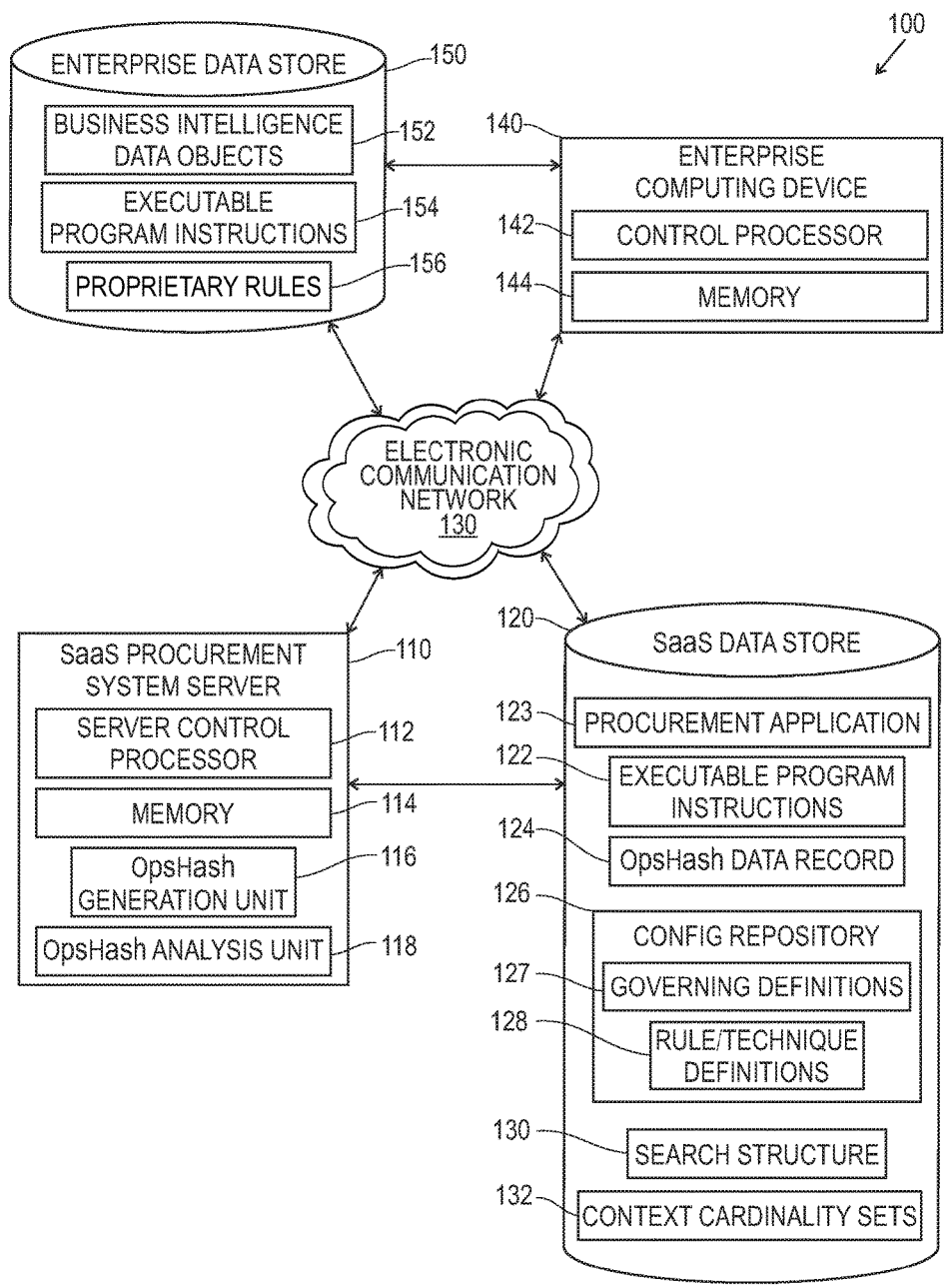
FIG. 1 depicts a SaaS procurement customization system in accordance with embodiments.

FIG. 1 depicts SaaS procurement customization system 100 in accordance with embodiments. An embodying system can include a SaaS procurement system server (SaaS server) 110, which can be in communication with SaaS data store 120 either directly and/or across electronic communication network 130. The SaaS server can include server control processor 112 and memory 114. The server control processor can access executable program instructions 122 in data store 120, which causes control processor 112 to control components of the system 100 to support embodying operations by executing executable program instructions 122. Dedicated hardware, software modules, and/or firmware can implement embodying services disclosed herein.

Electronic communication network 130 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 130.

Enterpriser computing device 140 can be of any type of computing device suitable for use by an end user in performance of the end user's purpose (e.g., personal computer, workstation, thin client, netbook, notebook, tablet computer, mobile device, etc.). Enterprise computing device 140 can include control processor 142 that communicates with other components of the enterprise computing device. Control processor 142 accesses computer executable program instructions 154, which can include an operating system, and software applications. Enterprise computing device 140 can be in bidirectional communication with SaaS server 110, and other components of system 100, across electronic communication network 130.

Enterprise computing device 140 is in communication with enterprise data store 150. Located at data store 150 can be business intelligence data objects 152 can include data items and records relevant to the enterprise (e.g., sales, invoicing, vendor information, parts list, purchase history, inventory levels, customer information, etc.). Proprietary rules 156 can be procurement rules, guidelines, and/or practices followed by procurement operations of the enterprise. The proprietary rules can be provided to the SaaS server for custom incorporation into procurement application 123.

In accordance with embodiments, SaaS server 110 can include OpsHash generation unit 116 that generates OpsHash code strings, which are a unique fingerprint combining a procurement BI data object with functionality operations of executable instructions performed on that specific BI data object by procurement application 123. OpsHash analysis unit 118 can analyze generated OpsHash code strings to evaluate and/or quantify the conformity of the functionality operations with generally accepted business rules, regulatory and/or geographic-specific procurement rules, and in some implementations, the proprietary rules provided by the enterprise.

Figure 2:
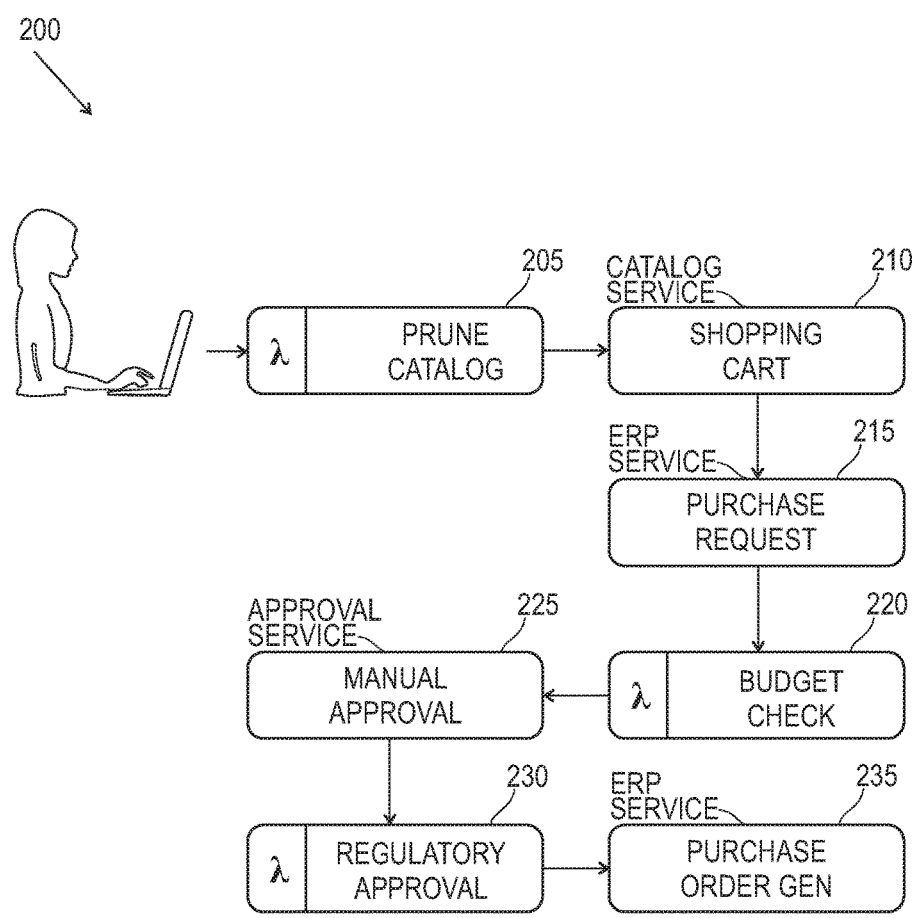
FIG. 2 depicts a user workflow for the system of FIG. 1 in accordance with embodiments.

FIG. 2 depicts a representative user workflow 200 for SaaS procurement customization system 100 in accordance with embodiments. In accordance with embodiments, a user can design a custom SaaS procurement solution application having a mix of services based on enterprise requirements (e.g., proprietary rules 156), along with jurisdictional and geographical procurement rules. In addition, the user can add one or more custom processing steps to the procurement application. For example, a catalog can be edited (pruned), step 205, depending on the location and designation of the user. Items to be procured can be added to shopping cart, step 210. An ERP (enterprise resource planning) system can be accessed to request the purchase, step 215. A budget check, step 220, can be made to check if the amount of the requested purchase is within a budget pre-approved for the user's location, designation, and/or cost center. In addition to a ERP system check, manual approval (step 225) can be performed for the requisition. If purchase request is within budget (i.e., approved) a regulatory check, step 230, verifies if the requisitioned goods or services meet regulatory parameters for the industry, vertical positioning, and geographic zone. Once approved, the ERP system can generate a purchase order, step 235.

In accordance with embodiments, customized code is added to the procurement application to meet an enterprise's procurement guidelines (e.g., approved vendors, items, costs, terms, etc.). Customized code also can be added to the procurement application to meet legal, regulatory, and other business guidelines.

In accordance with embodiments, an automated and scalable procurement customization solution can ascertain whether the customized code (and the resulting procurement application) meet all the necessary guidelines, rules, and regulations. The customized code needs to be evaluated to understand the purposes of the customization code. Further, the customized code needs to be compared with the guidelines to quantify its compliance.

In accordance with embodiments, if an evaluation results in system 100 indicating that the customization violates the generally accepted business rules or critical legal, business or regulatory directives, then SaaS procurement customization system 100 can trigger an exception. This exception can prevent the customized code from being pushed to the procurement application. In some implementations, where the customized code is already deployed, the exception trigger can stop the Business Process Flow from being executed to generate the purchase order.

In addition, the entire business process flow can be checked to see that if complies with the guidelines that the enterprise's policies, and the regulatory and legal policies and rules for that vertical and geography.

In accordance with embodiments, OpsHash generation unit 116 can generate a unique fingerprint for a snippet of customized code written in a domain specific language. This OpsHash fingerprint represents a specific combination of the customized code and the BI data object that the code is to operate upon.

In accordance with embodiments, each line of the code snippet is transformed into byte code. The byte code can include an ordered set of op codes. The BI data object(s) that are part of the line of code is then associated with the ordered set of op codes to make the OpsHash code string for that line of code. This OpsHash code string is a unique fingerprint that combines the procurement BI data object and the operations that are being done, resulting in a representation of the purpose of the line of code with a high degree of fidelity.

By combining all the OpsHash code strings as an ordered collection produces a fingerprint for the entire snippet of customized code undergoing evaluation.

By way of example and illustration of the OpsHash generation, the following pseudocode can represent a snippet of code, written in a domain specific language, to describe the creation of a Purchase Order—for example, as indicated in step 235.

```
If (Requisition.Create) {
Location customerLocation=getCustomerLocation( );
BusinessUser=getCurrentUser( );
Catalog prunedCatalog=Catalog.pruneCatalog(customerLocation, user);
ShoppingCart=getItemsInteractively(prunedCatalog, businessUser);
// Will render catalog UI and build cart
If (BudgetCheck.passed (shoppingCart, businessUser) {
Requisition  newRequisition=generateRequisition(shoppingCart,
businessUser);
}
}
```

The first line, which is "If (Requisition.Create) {"can, in accordance with embodiments, generate the following Op Codes, on being transformed to Byte Code:

0: iload_1
1: iload_2
2: if_icmple 7
5: iconst_0
6: ireturn
7: iconst_1
8: ireturn This sequence can produce the sequence of Op Codes: {21, 21, 164, 3, 172, 4, 172}. At this stage, the Requistion business object can be combined with the sequence of Op Codes to generate an OpsHash for the first line—[Requisition, {21, 21, 164, 3, 172, 4, 172}].

For each line of the snippet, the process generating Op Codes, on being transformed to Byte Code can result in the following collection of OpsHashes:

[
[Requisition, {21, 21, 164, 3, 172, 4, 172}],
[Location, {8, 254, 3, 3, 172, 4, 178}],
[BusinessUser, {8, 254, 3, 3, 172, 4, 172}],
[Catalog, {21, 254, 21, 3, 172, 4, 178}],
. . .
]

Next, the OpsHash are divided into two categories, context and operation-on-context. This division can allow OpsHash Analysis unit 118 to perform an analysis of the match between a rule entered by the user and governing rules existing in the system. A quick look-up in determining the match can be done by looking at the approximate similarity of the context. In accordance with embodiments, next to evaluate an approximate candidate, each rule is converted into a set with cardinality. The sets can be stored in context and cardinality sets 132.

User entered—Lets call this U
Requisition—2
BusinessUser—1
Existing rules could have partial id as follows:
A)
Requisition—1
BusinessUser—1
B)
Requisition—2
Catalog—1
BusinessUser—1
C)
BusinessUser—1
Catalog—1
Location 2
D)
Catalog—2
Location 2

In accordance with embodiments, OpsHash analysis unit 118 can compare the similarity of the rules by applying the following algorithm.

In accordance with embodiments, the first canon (Canon 1) for matching is that because all the operational rules are precise, all the defined requisition objects should be present in the existing rules. By applying Canon 1, the selection of sets is pruned to set A and set B, because sets C and D do not match the context rules. The following set operation can be used to define matching:

Set($U-A$)=Nil

Set($U-B$)=Catalog

Thus, set A is a closer match. If there are multiple sets with same values at this stage, a percentage match can be calculated. For example, A with $U$=0.5+1=1.5

(½+1/1); and

B with $U$=1+1=2

(2/2+1/0+1/1)

where 1/0 or any invalid values are converted to 0.

Because set A is already superior to set B as per Canon 1, hence A>B. If Canon 1 resulted in sets A and B being the same match, then since set B value (=2) is higher than set A value (1.5), then B>A. Application of these two criteria helps to reduce the sets being evaluated, and provides a ranking match.

In accordance with embodiments, the OpsHash analysis unit applies the OpHash fingerprint search algorithm to look for similarities based on an overall hash of the fingerprint. Also, the analysis includes a more minute matching if the overall hash matches above some confidence level.

According to embodiments, after reducing candidate snippets, a more exact matching can be performed on the resultant subset. The process of matching to the exact rule can proceed by first creating a string representation of the OpsHash(s) under consideration. For example, each OpsHash is taken as a character in the creation of the OpsHash string to be used for matching. As an example, the OpHash presented above can be used to generate OpsHash strings as follows:

{R, 21, 21, 164, 3, 172, 4, 172}, {L, 8, 254, 3, 3, 172, 4, 178}, {B, 8, 254, 3, 3, 172, 4, 172}, {21, 254, 21, 3, 172, 4, 178} . . .

This OpsHash string can be used to perform a matching between the different rules and the user entered rule. Each character in the OpsHash String is as follows "{ . . . }"-Canon 2. In accordance with embodiments, the following pseudocode represents the approximate matching algorithm to perform the matching and get the number of changes in the two OpsHash code strings.

DistanceBetweenOpsHashes: opsHashStringOne and: opsHashStringTwo

```
| arrayTwo arrayOne|
"degenerate cases"
stringTwo = opsHashStringOne
    ifTrue:[/\0].
(opsHashStringTwo size) = 0
    ifTrue:[/\( opsHashStringOne size)].
    (opsHashStringOne size) = 0
    ifTrue:[/\( opsHashStringTwo size)].
    arrayOne := Array new:(( opsHashStringTwo size) + 1).
    arrayTwo := Array new:(( opsHashStringTwo size) + 1).
    (1 to: (arrayOne size)) do:[:i | arrayOne at: i put: i-1 ].
    (1 to: (opsHashStringOne size)) do: [: i |
```

-continued

```
    arrayTwo at: 1 put: i.
    (1 to: (stringTwo size)) do: [:j || cost minimum minimumAux
        ((opsHashStringOne at: i) = (opsHashStringTwo at: j))
            ifTrue:[cost:= 0]
            ifFalse:[cost:= 1] .
        minimumAux := ((arrayTwo at: j) + 1) min: ((arrayOne at:
            (j + 1)) + 1).
        minimum := minimumAux min: ((arrayOne at: j) + cost).
        arrayTwo at: (j + 1) put: minimum.].
    (1 to: (arrayOne size)) do: [:j | arrayOne at: j put: (arrayTwo at: j)
].
].
/\arrayTwo at: ((opsHashStringTwo size)+ 1).
```

The above approximate matching algorithm returns the number of changes in the two OpsHash code strings. The delta between the changes can be used to compute a confidence level of match, and suggest matches to the customer.

Figure 3:
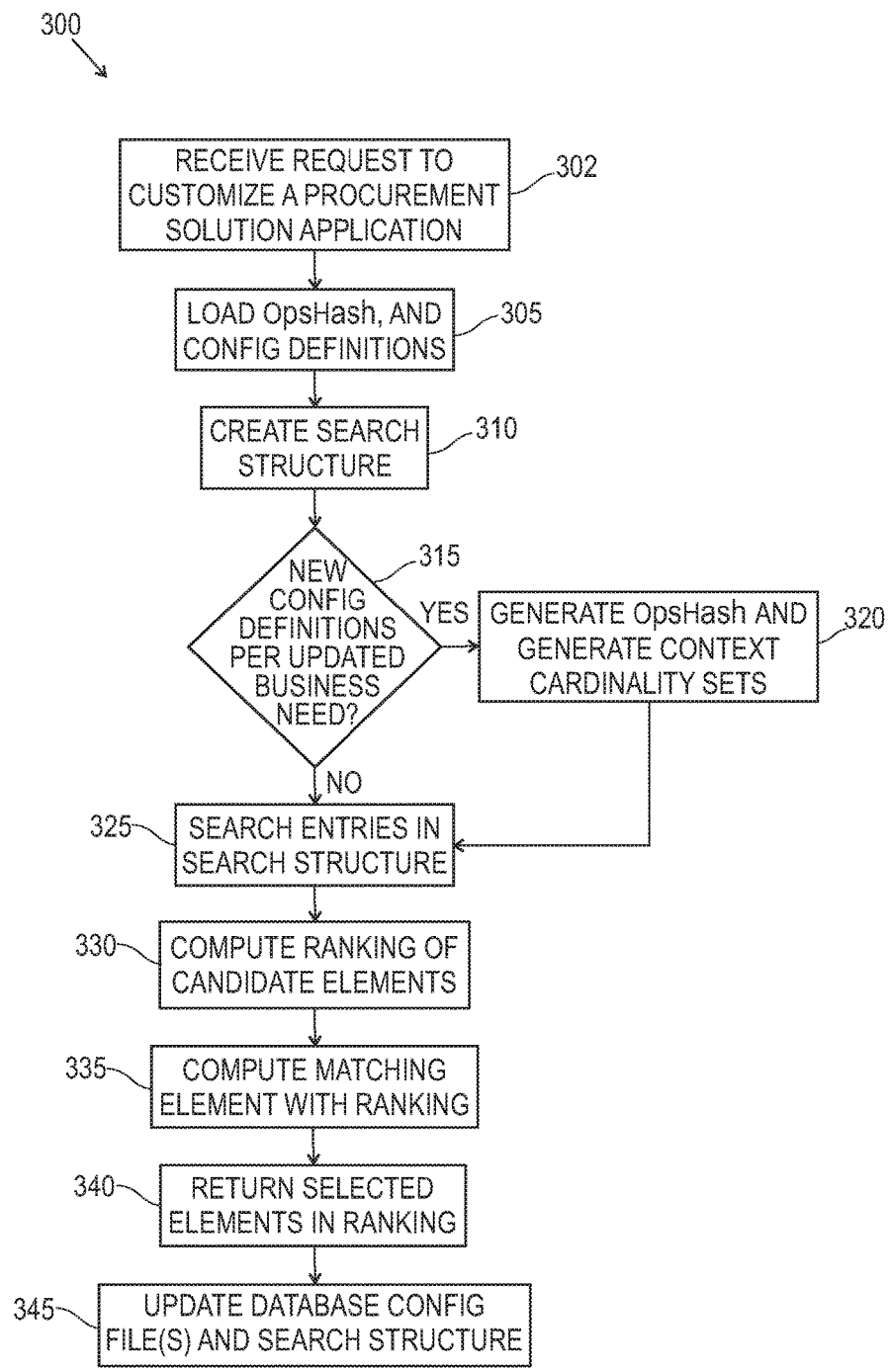
FIG. 3 depicts a flowchart of a process for SaaS procurement customization in accordance with embodiments.

FIG. 3 depicts SaaS procurement customization process 300 in accordance with embodiments. A request to customize a procurement solution application is received, step 302. The request can be sent from a user and include a rule, procedure, and/or guideline to be incorporated into the application. For example, the request can include one or more of proprietary rules 156, or jurisdictional, legal, and/or regulatory rule.

The OpsHash records 124, governing definitions 127, and rule/technique definitions 128 are loaded into the SaaS server, step 305. A search structure 130 is created, step 310, based on context and cardinality sets 132. In accordance with implementations, the search structure can be based on a prior appropriate search structure previously generated and stored in SaaS data store 120. The search structure can be multidimensional. Entries in the search structure can be searched for candidate entries.

In accordance with embodiments, a determination is made regarding whether new CONFIG definitions are needed per an updated business need, step 315 (for example, the request includes customization previously generated and quantified. If no new definitions are needed, then a search is made (step 325) of entries in the search structure. If there are new definitions needed, then OpsHash and context cardinality sets are generated, step 320. The process then continues to step 325.

The ranking of candidate elements is computed, step 330, based on the context and cardinality probably approximate matching algorithm. Candidate elements are then ranked, step 335, by confidence level. Elements from the ranking are selected, step 340. This selection of elements can be done by quantifying the conformity of the element(s) to the rule, procedure, and/or guideline contained in the received request from step 302. Governing definitions 127, rule/technique definitions in CONFIG repository 126 and search structure 130 can be updated with the results. In some implementations, as a result of the quantification, customized code determined to be acceptable can be pushed to one or more SaaS procurement systems. The procurement solution application within the SaaS procurement systems can be updated to execute the code snippets.

It can be readily understood by persons of skill in the art that the systems and methods disclosed herein have applicability to other SaaS, and local, applications. For example, a trading platform application operating in the finance industry can require adherence and compliance to a multitude of local rules, regulations, and guidelines. Any alterations to the trading application can benefit from a determination as to whether the code snippets are compliant. In the medical field, a determination of compliance with drug interaction rules, regulations, and guidelines can be made by applying the system and methods disclosed herein.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method for quantifying the compliance and/or adherence to rules, regulations, and/or guidelines of custom snippet code used to modify a computer application, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for quantifying conformity of a software snippet having a plurality of code lines, the method comprising:
    generating a plurality of OpsHash fingerprints of the software snippet, wherein each OpsHash fingerprint is generated from a respective code line of the software snippet;
    dividing the plurality of OpsHash fingerprints into a first group containing OpsHash fingerprints generated from context code lines of the plurality of code lines, and a second group containing OpsHash fingerprints generated from operation-on-context code lines of the plurality of code lines;
    applying a probably approximate matching algorithm to the first group;
    generating context cardinality sets from the OpsHash fingerprints of the first group;
    quantifying a match between each of the context cardinality sets and at least one of a governing definition and a rule/technique definition;
    ranking the OpsHash fingerprints of the first group based on the quantifying match;
    incorporating one or more code lines of the software snippet with OpsHash fingerprint ranking above a predetermined threshold into a software application; and
    executing the software application.

2. The method of claim 1, further including:
    receiving a request to modify the software application, the request identifying one of a rule, a procedure, and a guideline to be incorporated into the software application; and
    producing in the plurality of code lines to implement the identified one of the rule, the procedure, and the guideline.

3. The method of claim 1, wherein the generating the plurality of OpsHash fingerprints includes:
    transforming each of the plurality of code lines into a byte code representation of the respective code line;
    associating a business intelligence object in a respective line of code with an ordered sequence of op codes; and
    combining the business intelligence object op code sequences with the byte code representation for each respective code line.

4. The method of claim 1, further including:
    creating a search structure based on the software snippet;
    applying the search structure to search a repository of at least one of a governing definition and a rule/technique definition;
    determining whether at least a portion of the software snippet matches at least one of the governing definitions and the rule/technique definition; and
    when a match is determined, providing the matching definition to the quantifying step.

5. The method of claim 1, further including:
    loading one or more governing definitions and rule/technique definitions from a data store; and
    when the context cardinality sets fail to match at least one of the governing definition and the rule/technique definition, creating in the data store at least one of an additional governing definition and an additional rule/technique definition.

6. A non-transitory computer-readable medium having stored thereon instructions which when executed by a processor cause the processor to perform a method for quantifying conformity of a software snippet having a plurality of code lines, the method comprising:
    generating a plurality of OpsHash fingerprints of the software snippet, wherein each OpsHash fingerprint is generated from a respective code line of the software snippet;
    dividing the plurality of OpsHash fingerprints into a first group containing OpsHash fingerprints generated from context code lines of the plurality of code lines, and a second group containing OpsHash fingerprints generated from operation-on-context code lines of the plurality of code lines;
    applying a probably approximate matching algorithm to the first group;
    generating context cardinality sets from the OpsHash fingerprints of the first group;
    quantifying a match between each of the context cardinality sets and at least one of a governing definition and a rule/technique definition;
    ranking the OpsHash fingerprints of the first group based on the quantifying match;
    incorporating one or more code lines of the software snippet with OpsHash fingerprint ranking above a predetermined threshold into a software application; and
    executing the software application.

7. The non-transitory computer-readable medium of claim 6, the instructions further configured to cause the processor to perform the steps of:
    receiving a request to modify the software application, the request identifying one of a rule, a procedure, and a guideline to be incorporated into the software application; and producing in the plurality of code lines to implement the identified one of the rule, the procedure, and the guideline.

8. The non-transitory computer-readable medium of claim 6, the instructions further configured to cause the processor to perform the step of generating the plurality of OpsHash fingerprints includes:

transforming each of the plurality of code lines into a byte code representation of the respective code line;

associating a business intelligence object in a respective line of code with an ordered sequence of op codes; and combining the business intelligence object op code sequences with the byte code representation for each respective code line.

9. The non-transitory computer-readable medium of claim 6, the instructions further configured to cause the processor to perform the steps of:

creating a search structure based on the software snippet;

applying the search structure to search a repository of at least one of a governing definition and a rule/technique definition;

determining whether at least a portion of the software snippet matches at least one of the governing definitions and the rule/technique definition; and when a match is determined, providing the matching definition to the quantifying step.

10. The non-transitory computer-readable medium of claim 6, the instructions further configured to cause the processor to perform the steps of:

loading one or more governing definitions and rule/technique definitions from a data store; and when the context cardinality sets fail to match at least one of the governing definition and the rule/technique definition, creating in the data store at least one of an additional governing definition and an additional rule/technique definition.

11. A system for quantifying conformity of a software snippet, the system comprising:

a server comprising a processor and memory, wherein the processor is configured to access executable program instructions stored on the memory, the executable program instructions configured to cause the processor to perform a method including:

generating a plurality of OpsHash fingerprints of the software snippet, wherein each OpsHash fingerprint is generated from a respective code line of the software snippet;

dividing the plurality of OpsHash fingerprints into a first group containing OpsHash fingerprints generated from context code lines of the plurality of code lines, and a second group containing OpsHash fingerprints generated from operation-on-context code lines of the plurality of code lines;

applying a probably approximate matching algorithm to the first group;

generating context cardinality sets from the OpsHash fingerprints of the first group;

quantifying a match between each of the context cardinality sets and at least one of a governing definition and a rule/technique definition;

ranking the OpsHash fingerprints of the first group based on the quantifying match;

incorporating one or more code lines of the software snippet with OpsHash fingerprint ranking above a predetermined threshold into a software application; and executing the software application.

12. The system of claim 11, the instructions further configured to cause the processor to perform the steps of:

receiving a request from a remote server to modify the software application, the request identifying one of a rule, a procedure, and a guideline to be incorporated into the software application; and producing in the plurality of code lines to implement the identified one of the rule, the procedure, and the guideline.

13. The system of claim 11, the instructions further configured to cause the processor to perform the step of generating the plurality of OpsHash fingerprints includes:

transforming each of the plurality of code lines into a byte code representation of the respective code line;

associating a business intelligence object in a respective line of code with an ordered sequence of op codes; and combining the business intelligence object op code sequences with the byte code representation for each respective code line.

14. The system of claim 11, the instructions further configured to cause the processor to perform the steps of:

creating a search structure based on the software snippet;

applying the search structure to search a repository of at least one of a governing definition and a rule/technique definition;

determining whether at least a portion of the software snippet matches at least one of the governing definitions and the rule/technique definition; and when a match is determined, providing the matching definition to the quantifying step.

15. The system of claim 11, the instructions further configured to cause the processor to perform the steps of:

loading one or more governing definitions and rule/technique definitions from a data store; and when the context cardinality sets fail to match at least one of the governing definition and the rule/technique definition, creating in the data store at least one of an additional governing definition and an additional rule/technique definition.

* * * * *